US007961359B2

(12) United States Patent
Seta

(10) Patent No.: US 7,961,359 B2
(45) Date of Patent: Jun. 14, 2011

(54) SEMICONDUCTOR DEVICE AND DISPLAY DEVICE

(75) Inventor: Shoji Seta, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1018 days.

(21) Appl. No.: 11/755,114

(22) Filed: May 30, 2007

(65) Prior Publication Data

US 2007/0279575 A1 Dec. 6, 2007

(30) Foreign Application Priority Data

May 30, 2006 (JP) ................................ 2006-150347

(51) Int. Cl.

*H04N 1/40* (2006.01)
*G06K 9/38* (2006.01)
*G06K 9/00* (2006.01)
*G06F 1/12* (2006.01)
*H04L 29/06* (2006.01)

(52) U.S. Cl. ......... 358/471; 713/401; 382/276; 382/162

(58) Field of Classification Search .................. 358/474, 358/475, 1.2; 713/401, 502; 327/141, 3, 327/39, 47, 160, 161, 162, 163; 382/276, 382/162, 205, 241, 293, 294, 295, 296, 297, 382/298

See application file for complete search history.

(56) References Cited

U.S. PATENT DOCUMENTS

| | | | | |
|---|---|---|---|---|
| 4,788,595 | A * | 11/1988 | Tamada et al. | 358/482 |
| 5,537,075 | A * | 7/1996 | Miyazaki | 327/566 |
| 5,805,130 | A | 9/1998 | Yamamoto et al. | |
| 6,038,380 | A * | 3/2000 | Wise et al. | 712/200 |
| 6,067,417 | A * | 5/2000 | Wise et al. | 712/18 |
| 6,310,628 | B1 | 10/2001 | Matsushita et al. | |
| 6,477,656 | B1 * | 11/2002 | Takaki et al. | 713/401 |
| 6,657,986 | B1 | 12/2003 | Laudel et al. | |
| 7,230,986 | B2 * | 6/2007 | Wise et al. | 375/240.26 |
| 7,471,411 | B2 * | 12/2008 | Takaki | 358/1.15 |
| 2003/0174792 | A1 | 9/2003 | Bow et al. | |
| 2004/0189579 | A1 | 9/2004 | Shimizu | |
| 2007/0085736 | A1 | 4/2007 | Ray et al. | |

FOREIGN PATENT DOCUMENTS

| | | |
|---|---|---|
| JP | 2002-341820 | 11/2002 |
| WO | 02/25829 | 3/2002 |
| WO | 02/46787 | 6/2002 |

* cited by examiner

*Primary Examiner* — Jerome Grant, II
(74) *Attorney, Agent, or Firm* — Turocy & Watson, LLP

(57) ABSTRACT

A semiconductor device includes: an LCD controller configured to output a plurality of image signals in parallel; a plurality of signal lines respectively corresponding to the plurality of image signals to be outputted in parallel; a plurality of terminal portions respectively connected to the plurality of signal lines; and delay circuits configured to delay a plurality of image signals, which are divided into a plurality of groups to the extent that the sum of each value of a current flowing through each signal line does not exceed a predetermined current value and outputted from a plurality of terminal portions, by a predetermined delay time from each other among the plurality of groups.

20 Claims, 12 Drawing Sheets

SEMICONDUCTOR DEVICE AND DISPLAY DEVICE

CROSS-REFERENCE TO RELATED APPLICATIONS

This application is based upon and claims the benefit of priority from the prior Japanese Patent Application No. 2006-150347 filed on May 30, 2006; the entire contents of which are incorporated herein by reference.

BACKGROUND OF THE INVENTION

1. Field of the Invention

The present invention relates to a semiconductor device and a display device and, more particularly, to a semiconductor device configured to output image signals and to a display device.

2. Description of Related Art

Traditionally, electronic equipment such as mobile phones have been widely used and in the mobile phone, various types of processing including image processing for displaying images on a display unit are performed. Such image processing and other types of processing are achieved using semiconductor devices.

When such image processing is performed, the semiconductor device collectively outputs a plurality of image signals from a control portion to a display unit (for example, a liquid crystal display, which is hereinafter referred to as an LCD) for each picture element (i.e., one pixel) of a color image. For example, if each of the three RGB colors is represented by an 8-bit signal, a 24-bit image signal is necessary to display a single pixel and therefore 24-bit image signals are outputted in parallel on a pixel-by-pixel basis. If each of the three RGB colors is represented by a 6-bit signal, an 18-bit image signal is necessary to display a single pixel and therefore 18-bit image signals are outputted in parallel on a pixel-by-pixel basis. If each of the RB colors is represented by a 5-bit signal and the G color is represented by a 6-bit signal, a 16-bit image signal is necessary to display a single pixel and therefore 16-bit image signals are outputted in parallel on a pixel-by-pixel basis.

Accordingly, the semiconductor device outputs a plurality of image signals both simultaneously and in parallel.

However, outputting a plurality of image signals both simultaneously and in parallel causes a large amount of power to be consumed partially and instantaneously within the semiconductor device. If a large amount of power is consumed partially and instantaneously within the semiconductor device, a short supply of power may occur in other areas of circuitry within the semiconductor device. If a necessary amount of power is not supplied to any part of the semiconductor device, the circuitry within the semiconductor device may malfunction.

As a method for reducing such maximum instantaneous power consumption in a display device, there is proposed a method for feeding data signals to different groups of signal electrodes at shifted timings in Japanese Patent Laid-Open No. 2002-341820. In the configuration of the proposed method, data load instructions are generated so that a plurality of signal-side drive means are driven independent of each other. However, no specific means is shown against the above-described problem that a large amount of power is consumed partially and instantaneously within the semiconductor device or the like when a plurality of image signals are transmitted or received both simultaneously and in parallel.

Another possible solution is to simply divide a plurality of image signals and output them in units of the image signals thus divided. Divisional output is not preferable, however, in terms of image processing speed and becomes even more undesirable as the screen size of a display device increases.

The present invention has been accomplished in view of the above-described problems and an object of the present invention is to provide a semiconductor device capable of suppressing instantaneous current consumption (peak current) in outputting a plurality of image signals.

BRIEF SUMMARY OF THE INVENTION

A semiconductor device according to one aspect of the present invention includes: an image signal output circuit configured to output a plurality of image signals in parallel; a plurality of signal lines respectively corresponding to the plurality of image signals to be outputted in parallel; a plurality of first terminal portions respectively connected to the plurality of signal lines; and delay circuits configured to delay a plurality of image signals, which are divided into a plurality of groups to the extent that the sum of each value of a current flowing through each signal line does not exceed a predetermined current value and outputted from the plurality of first terminal portions, by a predetermined delay time from each other among the plurality of groups.

DETAILED DESCRIPTION OF THE EMBODIMENTS OF THE INVENTION

The preferred embodiments of the present invention are described hereinafter with reference to the accompanying drawings.

Figure 1:
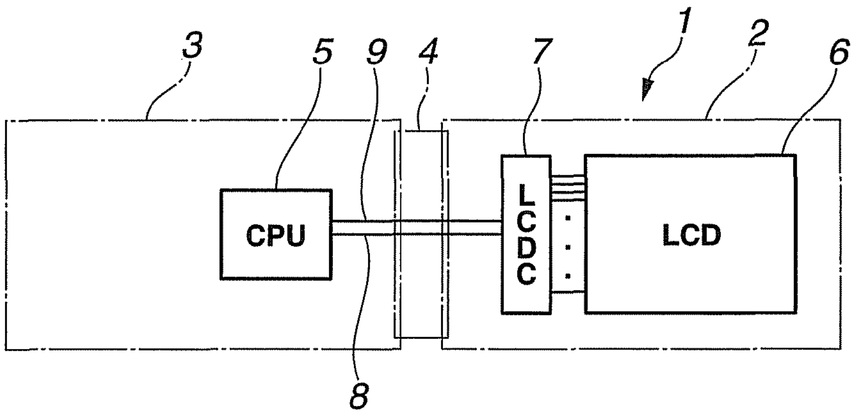
FIG. 1 is a block diagram illustrating an example of configuration of electronic equipment in accordance with the embodiments of the present invention.

FIG. 1 is a block diagram illustrating an example of configuration of electronic equipment in accordance with the embodiments of the present invention. The example of electronic equipment illustrated in FIG. 1 is a mobile phone 1. The mobile phone 1 is a twofold device composed mainly of a display portion 2 and an operating portion 3 and is one of display devices configured to display images. The display portion 2 and the operating portion 3 are coupled using a hinge portion 4, and the display portion 2 is configured so that the visual surface thereof can be opened and closed against the operating portion 3.

Unillustrated operating keys and other components are provided in the operating portion 3, which mainly includes a CPU 5 as a control portion configured to perform various types of processing such as operation processing and image processing. The display portion 2 mainly includes an LCD 6 as a display unit and an LCD-controlling controller 7 configured to control the LCD 6 (hereinafter abbreviated as the LCDC). The CPU 5 performs image processing, etc. and generates a plurality of image signals. Note that as the control portion, a DSP may be used in place of the CPU.

Image signals and control signals (a clock signal only or a clock signal and an address signal, etc.) from the CPU 5 are respectively fed through a high-speed serial line 8 which is an image signal line and through a control signal line 9 to the LCDC 7. Under the control of the control signals, the LCDC 7 converts the image signals inputted as serial signals into parallel image signals and outputs the converted image signals to the LCD 6 along with predetermined control signals. The control signals include a vertical synchronizing signal VSYNC, a horizontal synchronizing signal HSYNC, a clock signal DCLK, and an enable signal DEN. The LCD 6 displays an image based on the inputted parallel image signals in a display area.

Figure 2:
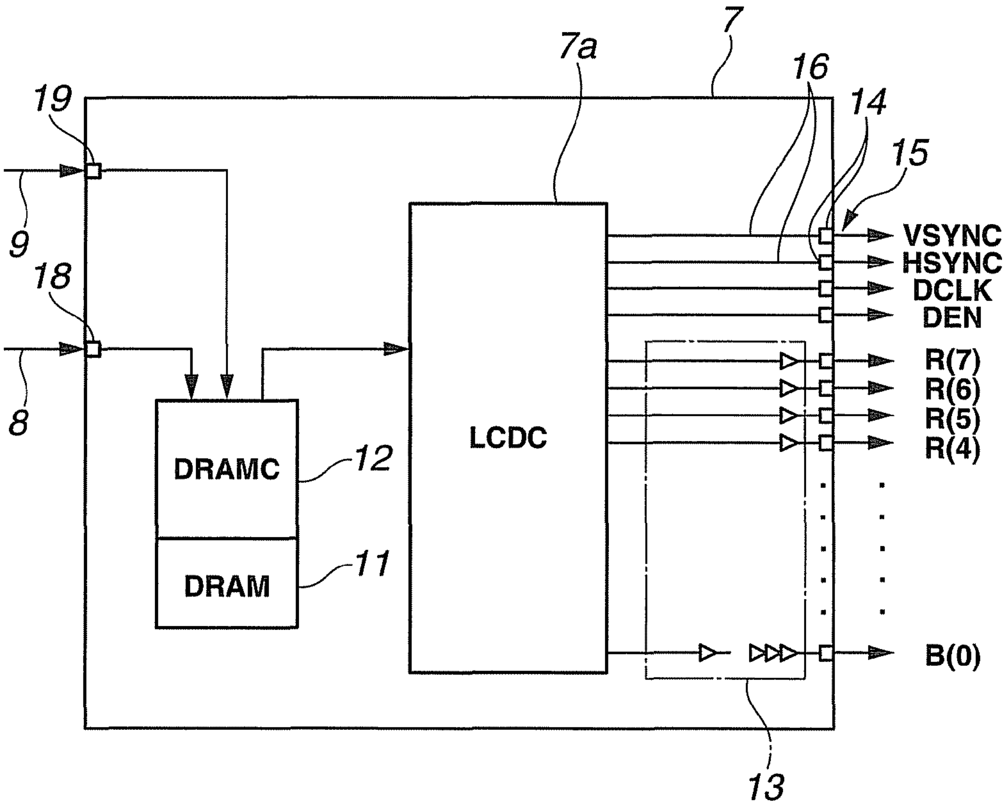
FIG. 2 is a block diagram illustrating an example of configuration of an LCDC.

FIG. 2 is a block diagram illustrating an example of the configuration of the LCDC 7. The LCDC 7 is, for example, a semiconductor chip which is a semiconductor device. The LCDC 7 in accordance with the present embodiment includes a DRAM 11, a controller 12 configured to control the DRAM 11 (hereinafter abbreviated as the DRAMC 12), and a delay processing portion 13, in addition to an LCDC 7*a* which is a circuit portion having a controller function configured to control the LCD 6. In the LCDC 7 which is a single semiconductor chip, there is provided a terminal group 15 composed of a plurality of terminal portions 14 configured to output various signals to the LCD 6. Here, each terminal portion 14 is an electrode pad which is a terminal of the semiconductor chip. The DRAMC 12 includes a data control portion configured to arbitrate external and internal data.

A serial image signal from the CPU 5 is temporarily stored in the DRAM 11 under the control of the DRAMC 12, and then fed to the LCDC 7*a* as a serial signal. The LCDC 7*a* performs predetermined processing and retains a plurality of image signals. The LCDC 7*a* serving as an image signal output circuit outputs a plurality of control signals and a plurality of image signals respectively as parallel signals through a plurality of signal lines 16 connected to the terminal group 15.

As a result, the vertical synchronizing signal VSYNC, horizontal synchronizing signal HSYNC, clock signal DCLK, enable signal DEN and each RGB image signal are outputted from each terminal portion 14 of the terminal group 15 to the LCD 6.

Between the LCDC 7*a* and the terminal group 15, there is provided the delay processing portion 13 configured to delay the plurality of image signals by a predetermined delay time on a group-by-group basis. The delay processing portion 13 includes a plurality of delay circuits 17.

Note that a plurality of signals corresponding to the plurality of image signals from the CPU 5 are inputted from a terminal portion 18 to the LCDC 7 which is a semiconductor device through the DRAMC 12 and DRAM 11. Control signals from the CPU 5 are inputted from a terminal portion 19 to the DRAMC 12.

Figure 3:
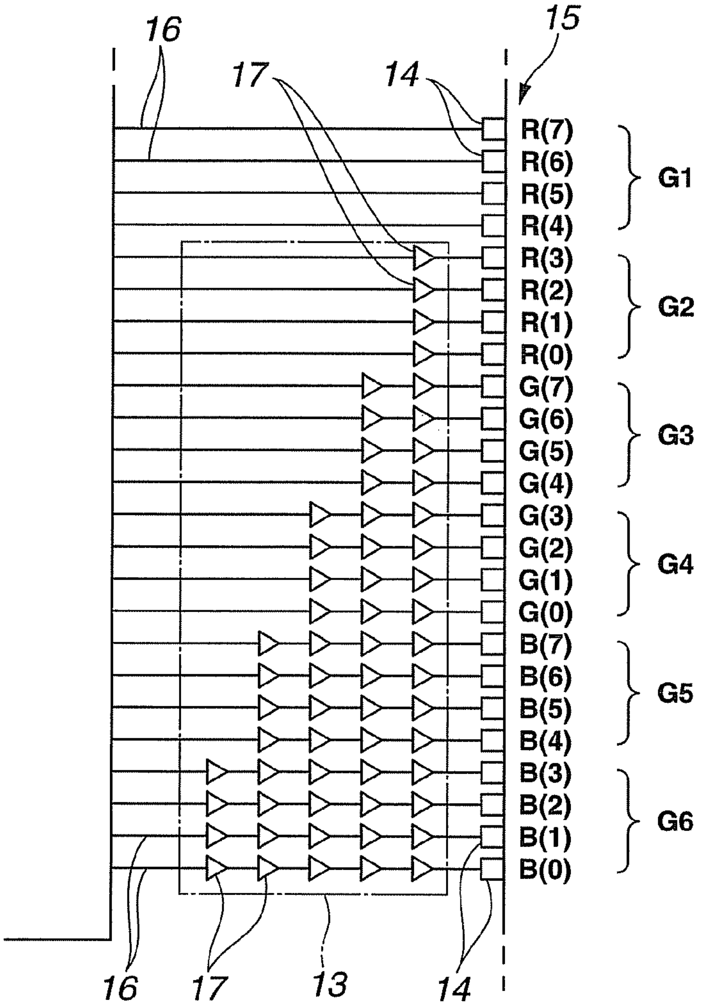
FIG. 3 is a circuit diagram intended to explain the configuration of a delay processing portion.

Furthermore, an explanation will be made of the delay processing portion 13 for image signals using FIG. 3. FIG. 3 is a circuit diagram intended to explain the configuration of the delay processing portion 13. Here, each of the RGB color image signals is an 8-bit signal and each single pixel of a color image is represented by a signal composed of 24 bits in total.

In the present embodiment, the value of a current flowing through each signal line is the same and one group is formed for each four image signals. Thus, the 24-bit image signal is divided into six groups. The eight R signals are divided into two groups G1 and G2, the eight G signals are divided into two groups G3 and G4, and the eight B signals are divided into two groups G5 and G6.

Each image signal of the group G1 is fed through each corresponding signal line 16 to each terminal portion 14 of the terminal group 15. Likewise, each image signal of the group G2 is fed through each corresponding signal line 16 to each terminal portion 14 of the terminal group 15. In this case, however, the delay circuit 17 is provided midway along each signal line 16 so that each image signal of the group G2 is delayed by a predetermined delay time t1 from each image signal of the group G1 before being fed to each terminal portion 14. Specifically, one delay circuit 17 is provided in each of the signal lines 16 corresponding to the group G2. More specifically, the predetermined delay time t1 is obtained with one delay circuit 17. Here, a buffer circuit is used as the delay circuit 17 and the buffer circuit is composed of, for example, two inverter circuits so that an output waveform is not inverted.

Likewise, each image signal of the group G3 is fed through each corresponding signal line to each terminal portion 14 of the terminal group 15. In this case, however, the delay circuits 17 are provided midway along each signal line so that each image signal of the group G3 is also delayed by the predetermined delay time t1 from each image signal of the group G2 before being fed to each terminal portion 14. Specifically, two delay circuits 17 are provided in each of the signal lines corresponding to the group G3. More specifically, a delay time twice the predetermined delay time t1 is obtained with two delay circuits 17.

In the same way as described above, a plurality of delay circuits 17 are provided midway along corresponding signal lines so that the image signals of the group G4 are delayed by the predetermined delay time t1 from the image signals of the group G3, the image signals of the group G5 are delayed by the predetermined delay time t1 from the image signals of the group G4, and the image signals of the group G6 are delayed by the predetermined delay time t1 from the image signals of the group G5. As illustrated in FIG. 3, three delay circuits 17 are provided midway along the signal lines corresponding to the image signals of the group G4, four delay circuits 17 are provided midway along the signal lines corresponding to the image signals of the group G5, and five delay circuits 17 are provided midway along the signal lines corresponding to the image signals of the group G6.

Figure 4:
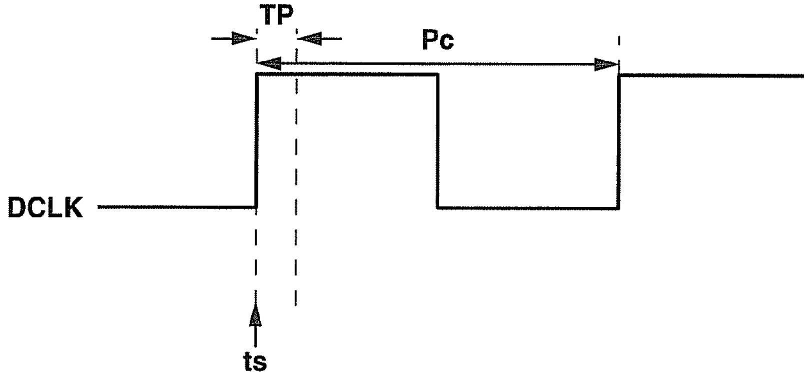
FIG. 4 is a timing chart intended to explain the output timing of an image signal.

Now an explanation will be made of the output timing of a plurality of image signals. FIG. 4 is a timing chart intended to explain the output timing of an image signal. In FIG. 4, the outputting of each of the 24-bit RGB image signals from the LCDC 7*a* to a plurality of signal lines 16 is initiated simultaneously at the rising-edge timing ts of the signal waveform of a predetermined clock pulse DCLK. In FIG. 4, 24 image signals are outputted at the rising-edge timing ts of the period Pc of the clock pulse DCLK. The four image signals of the group G1 are directly outputted to terminal portions 14 through corresponding signal lines 16.

However, each image signal of the groups G2 to G6 outputted to each corresponding signal line 16 is fed to each terminal portion 14 through a single delay circuit 17 or a plurality of delay circuits 17 provided so that the delay times thereof differ from each other with reference to the timing ts. Consequently, the time at which an image signal reaches each terminal portion 14 differs among the six groups. Note especially that, as described above, the time TP taken from when each image signal of the group G1 is outputted from each terminal portion 14 to when each image signal of the group G6 is outputted from each terminal portion 14 (hereinafter referred to as the total delay time) is five times the delay time t1 (5×t1) in the case of FIG. 3.

Figure 5:
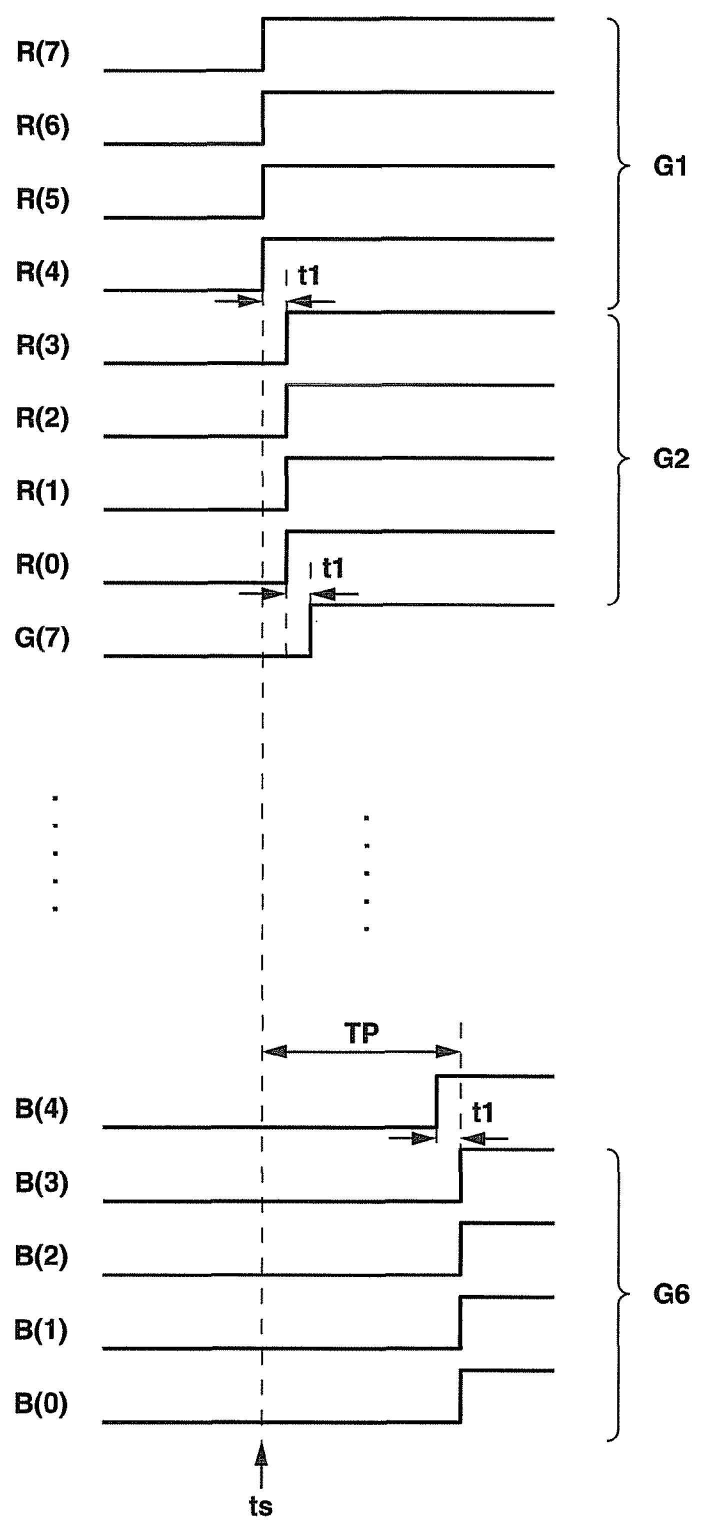
FIG. 5 is a schematic view intended to explain the output timing of each of RGB image signals.

FIG. 5 is a schematic view intended to explain the output timing of each of RGB image signals. Specifically, FIG. 5 is a schematic view intended to explain the timing of each image signal outputted from each terminal portion 14 in a delay period TP shown in FIG. 4. As illustrated in FIG. 5, the timing of each image signal outputted from each terminal portion 14 is shifted by the delay time t1 between groups. In the groups as a whole, the total delay time TP is taken for all of the image signals of a single pixel to be outputted to the LCD 6. As illustrated in FIG. 5, a period of time TP is taken from when the first-outputted image signals of the group G1 are outputted to when the last-outputted image signals of the group G6 are outputted.

Since the value of a current flowing through each signal line is the same, the total sum of currents consumed during group-by-group image signal output is also the same. Assuming, for example, that the output current of a single image signal is 4 mA, then the total sum of currents flowing through four signal lines is 16 mA. Consequently, according to this embodiment, the value of a current consumed at a time is 16 mA, whereas a current of 96 mA is consumed at a time in the past when 24 image signals are outputted simultaneously. Thus, by grouping signal lines, whereto image signals are outputted, according to the predetermined simultaneously consumed value of a current specified in terms of circuit design so as not to exceed the predetermined current value, it is possible to prevent a semiconductor device from, for example, malfunctioning due to a large amount of current being consumed when a plurality of image signals are output simultaneously.

Note here that the predetermined simultaneously consumed value of currents specified in terms of circuit design may include not only the value of a current consumed in the normal use of the mobile phone 1 but also the value of a current consumed during a test in a production process. Such a test is performed using test electrode pads. At the time of testing, circuit connection may be changed from that in normal use for the purpose of testing, causing an amount of test current larger than the current in normal use to flow. It is therefore preferable that the predetermined current value be decided taking into consideration a current flowing through each wire line during such testing. In either case, the predetermined current value is set to prevent the value of a current consumed at a time from causing other circuits to malfunction.

Also note that in the present embodiment, the total delay time TP is approximately 10 to 25% of a clock pulse period Pc. If the total delay time TP is set to approximately 25% of the clock pulse period Pc, the total delay time TP is 5 ns when the clock pulse period Pc is, for example, 20 ns. If the five image signal groups are delayed uniformly from each other, the delay time t1 between groups is 1 ns.

The reason for setting the total delay time TP to approximately 25% of the clock pulse period Pc is that even if the reception timing of a reception-side circuit (LCD 6 here) is at a point half the period of the clock pulse DCLK, it is possible to have image signals reliably received at the reception-side circuit and to output a plurality of image signals with an adequate delay time. For example, assume that the reception-side circuit receives image signals at the rising-edge timing of the clock pulse DCLK. Then, it is possible to reliably receive the image signals at the reception-side circuit by finishing outputting all of the image signals during a time interval from the rising-edge timing of the clock pulse DCLK to the 25% point in time of the clock pulse period Pc, when the timing of a read-in enable signal DEN coincides with the middle point of the clock pulse period Pc.

Note that in a case where a double clock is used, approximately 25% of the period between the rising edge and falling edge of the clock is the total delay time TP.

As heretofore described, according to the semiconductor device in accordance with the present embodiment, it is possible to prevent a short supply of power from occurring in other areas of circuitry within the semiconductor device due to a large amount of power being consumed partially and instantaneously within the semiconductor device. As a result, it is possible to prevent the circuitry within the semiconductor device from malfunctioning.

Next, an explanation will be made of examples of modification.

The example described above is when the value of a current flowing through each signal line is the same, where a plurality of signal lines are grouped sequentially from the one at the physical end position within the semiconductor device so that each group has the same number of signal lines. Specifically, in the above-described example, a plurality of signal lines are grouped so that the time obtained by dividing the total delay time by the number of groups equals the delay time between groups.

The first example of modification is when the value of a current flowing through each signal line is not the same, where a plurality of signal lines are grouped sequentially from the one at such an end as described above but in such a manner that the total sum of currents consumed during group-by-group image signal output does not exceed a predetermined current value.

Figure 6:
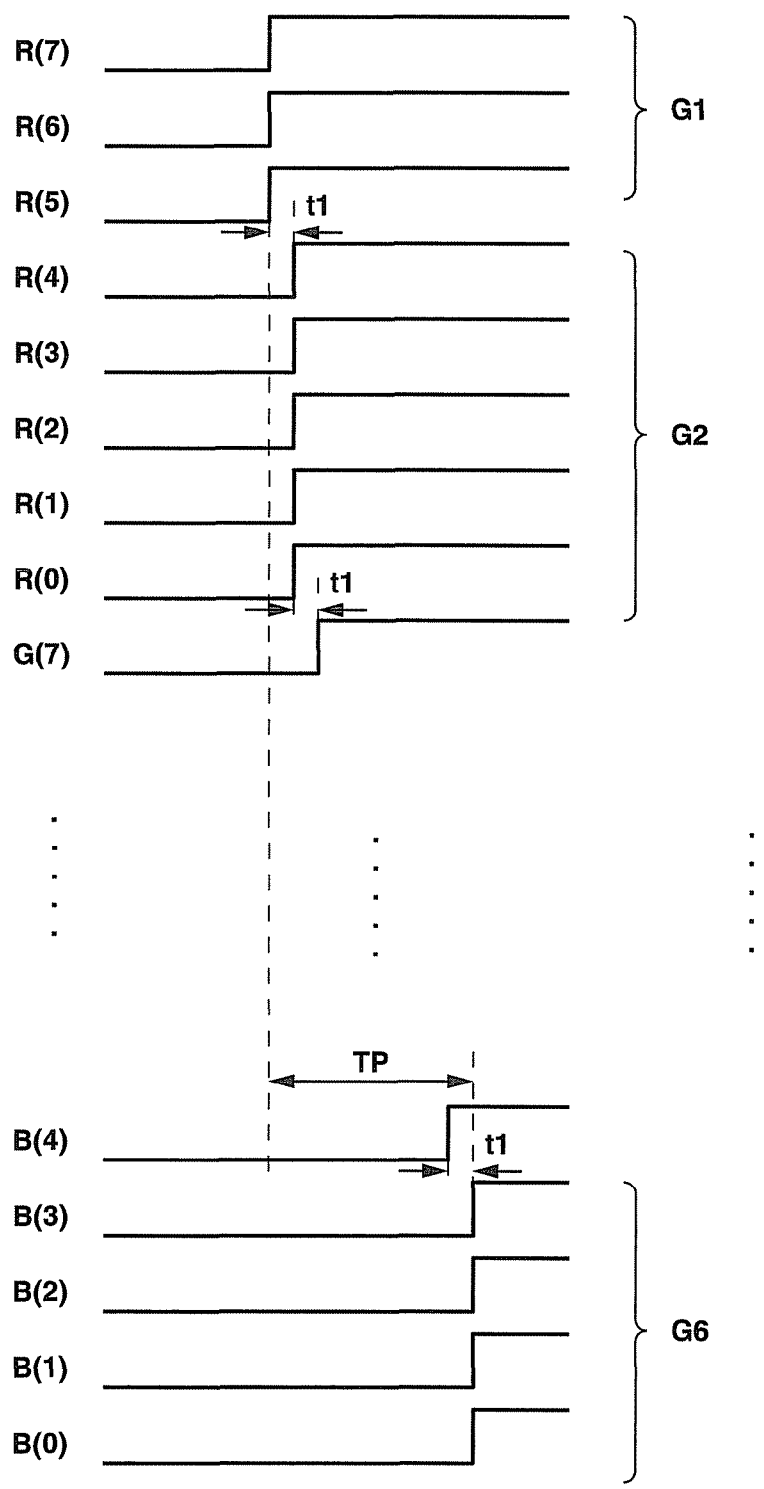
FIG. 6 is a schematic view intended to explain the output timing of each of RGB image signals in accordance with the first example of modification of the present invention.
Figure 7:
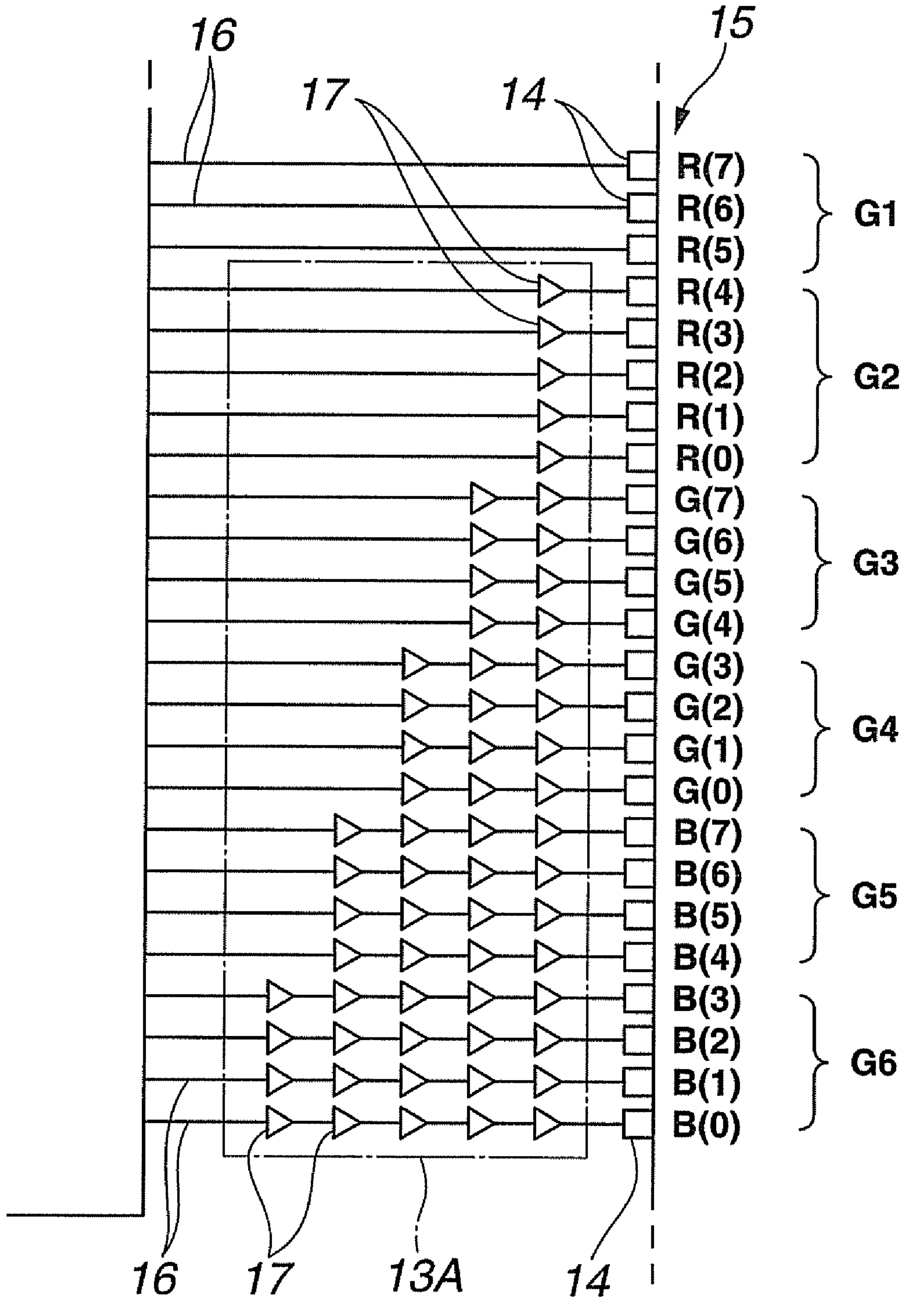
FIG. 7 is a circuit diagram intended to explain the configuration of the delay processing portion in accordance with the first example of modification of the present invention.

FIG. 6 is a schematic view intended to explain the output timing of each of RGB image signals in accordance with the first example of modification of the present invention. FIG. 7 is a circuit diagram intended to explain the configuration of the delay processing unit in accordance with the first example of modification of the present invention. As illustrated in FIG. 6, the timing of each image signal outputted from each terminal portion 14 is shifted by a delay time t1 between groups. In the groups as a whole, a total delay time TP is taken for all of the image signals to be outputted to an LCD 6. However, a group G1 is configured so that three signal lines constitute one group since one of the signal lines contained in the group G1 consumes a larger amount of current than other signal lines. For example, assume that a current of 8 mA flows through the signal line corresponding to an image signal R(5) and a current of 4 mA flows through the signal lines corresponding to the other image signals R(7) and R(6). Then, if a predetermined current value is 16 mA, the sum of currents flowing through the signal lines corresponding to the three image signals R(7) to R(5) coincides with the predetermined current value. For this reason, the group G1 is constituted by the signal lines corresponding to the image signals R(7) to R(5).

In addition, assume that a current of 2 mA flows through the signal lines corresponding to image signals R(4) and R(3) and a current of 4 mA flows through the signal lines corresponding to image signals R(2) to R(0). Then, the sum of currents flowing through the signal lines corresponding to the image signals R(4) to R(0) is 16 mA. Thus, a group G2 is constituted by the signal lines corresponding to the image signals R(4) to R(0).

Furthermore, since the sum of currents flowing through the signal lines corresponding to the image signals G(7) to G(4) is 16 mA, a group G3 is constituted by the signal lines corresponding to the image signals G(7) to G(4). Likewise, the sum of currents is also 16 mA for groups G4 to G6.

As described above, a plurality of signal lines may be sequentially grouped by such a number of signal lines that the total sum of currents consumed during group-by-group image signal output does not exceed a predetermined current value if a current flowing through each signal line differs from each other.

As the second example of modification, there is an example wherein a plurality of signal lines are grouped by such a number of signal lines that the total sum of currents consumed during group-by-group image signal output does not exceed a predetermined current value if the value of a current flowing through each signal line is not the same, rather than grouping the plurality of signal lines sequentially from the one at the physical end position within a semiconductor device.

Figure 8:
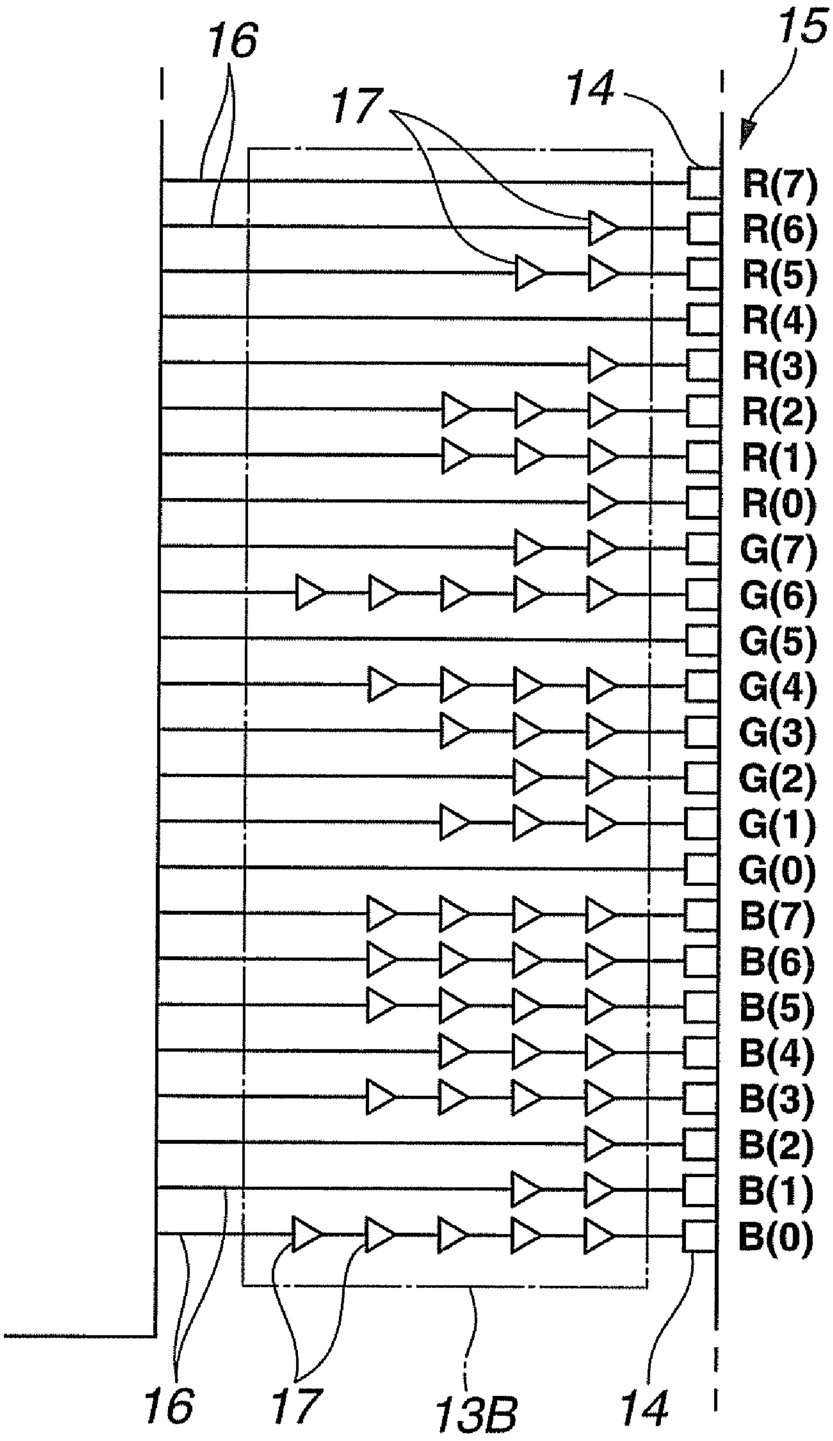
FIG. 8 is a schematic view intended to explain the output timing of each of RGB image signals in accordance with the second example of modification of the present invention.

FIG. 8 is a schematic view intended to explain the output timing of each of RGB image signals in accordance with the second example of modification of the present invention. Specifically, FIG. 8 is a circuit diagram intended to explain the configuration of the delay processing portion in accordance with the second example of modification of the present invention. Unlike FIG. 7, FIG. 8 illustrates that a plurality of signal lines are grouped by such a number of signal lines that the total sum of currents consumed during group-by-group image signal output does not exceed a predetermined current value, rather than grouping the plurality of signal lines sequentially from the one at the physical end position within a semiconductor device.

More specifically, the group G1 is a group with no delay time and includes the signal lines corresponding to the image signals R(7), R(4), G(5) and G(0). The group G2 is a group with a delay time t1 and includes the signal lines corresponding to the image signals R(6), R(3), R(0) and B(2). The group G3 is a group with a delay time 2×t1 and includes the signal lines corresponding to the image signals R(5), G(7), G(2) and B(1). The group G4 is a group with a delay time 3×t1 and includes the signal lines corresponding to the image signals R(2), R(1), G(3) and B(4). The group G5 is a group with a delay time 4×t1 and includes the signal lines corresponding to the image signals G(4), B(7), B(6), B(5) and B(3). The group G6 is a group with a delay time 5×t1 and includes the signal lines corresponding to the image signals G(6) and B(0).

In other words, a plurality of signal lines need not be grouped sequentially from the one at the physical end position. Rather, the plurality of signal lines may be grouped so that the total sum of currents consumed during group-by-group image signal output does not exceed a predetermined current value.

As the third example of modification, there is an example wherein such signals of one pixel as described above, for example, 24-bit image signals are grouped so as to be outputted serially as separate three RGB color signals but in parallel as grouped RGB color signals, rather than outputting the signals all in parallel.

Figure 9:
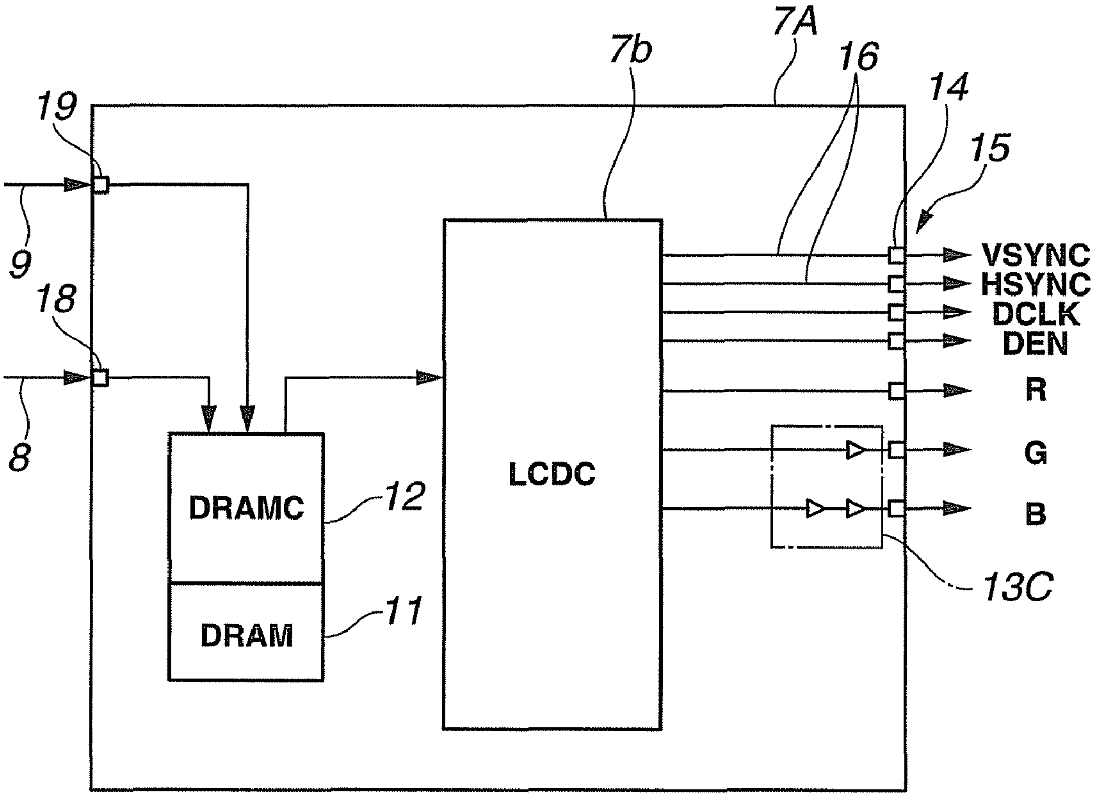
FIG. 9 is a block diagram illustrating an example of configuration of the LCDC in accordance with the third example of modification of the present invention.
Figure 10:
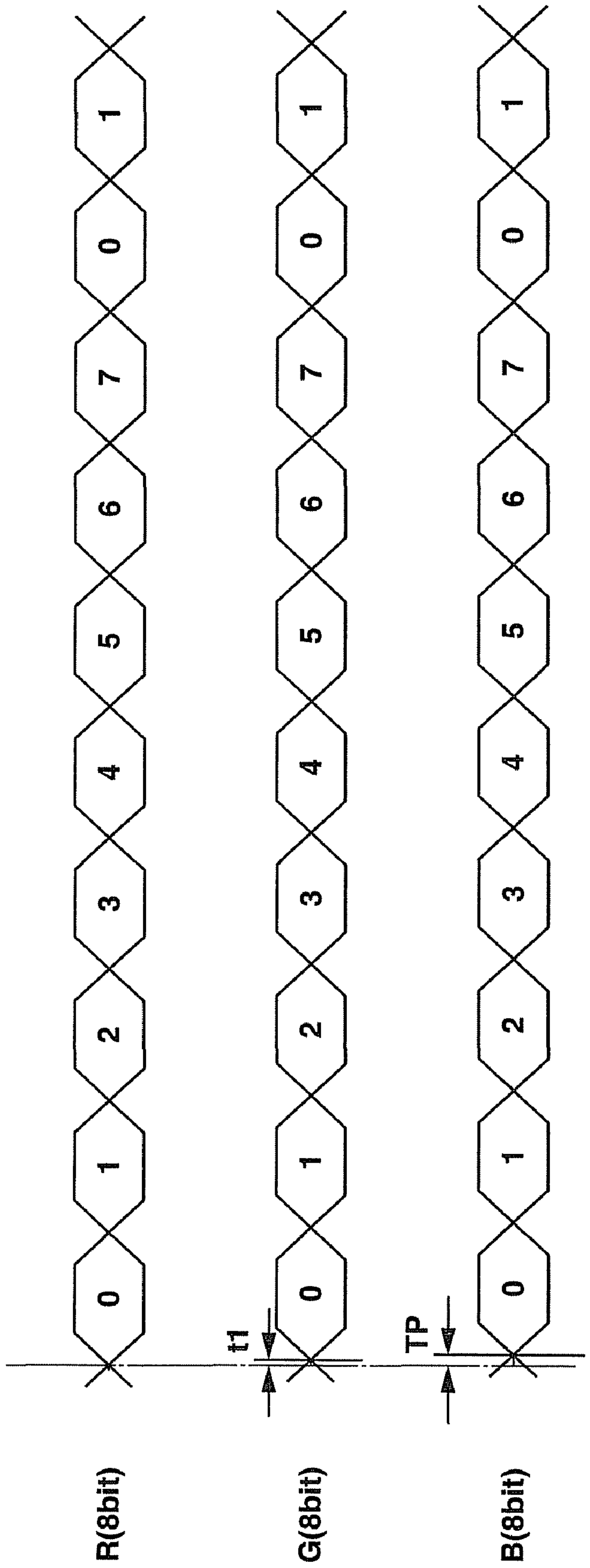
FIG. 10 is a waveform chart illustrating the output waveforms of the RGB image signals shown in FIG. 9.

FIG. 9 is a block diagram illustrating an example of configuration of an LCDC 7A wherein an LCDC 7*b* serving as an image signal output circuit outputs RGB image signals serially as separate RGB color signals but a delay time is provided among grouped RGB color signals. The LCDC 7*b* is configured so that each of the RGB signals is outputted from each terminal portion 14 through three signal lines 16. The LCDC 7A has a delay processing portion 13C and no delay circuits are provided in the signal line 16 corresponding to the R image signal. One delay circuit 17 is provided in the signal line 16 corresponding to the G image signal and two delay circuits 17 are provided in the signal line 16 corresponding to the B image signal. The waveforms of output signals in this case are illustrated in FIG. 10. FIG. 10 is a waveform chart illustrating the output waveforms of the RGB image signals shown in FIG. 9. As illustrated in FIG. 10, the total delay time TP of the three signals is 2×t1 and an 8-bit image signal is outputted serially for each of the RGB colors.

In this example of modification also, the total delay time TP of image signals outputted in parallel is approximately 10 to 25% of the clock pulse period Pc. If the total delay time TP is set to approximately 25% of the clock pulse period Pc and the clock pulse period Pc is, for example, 20 ns, the total delay time TP is 5 ns. If three image signal groups are delayed uniformly from each other, the delay time t1 between groups is approximately 1.7 ns.

As described above, even in a case where not all image signals are outputted in parallel, a plurality of signal lines may be grouped among image signals to be outputted in parallel, both sequentially from the one at the physical end position within a semiconductor device and by such a number of signal lines that the total sum of currents consumed during group-by-group image signal output does not exceed a predetermined current value. Note that in this example of modification also, the plurality of signal lines need not be grouped sequentially from the one at such an end position. For example, one delay circuit may be provided in the signal line 16 corresponding to the B image signal and two delay circuits may be provided in the signal line 16 corresponding to the G image signal in the case of FIG. 9.

When transferring a plurality of bits serially, a high driving capacity is generally required for each circuit. For this reason, such grouping as described above is performed to make it possible to suppress an instantaneous rise in power consumption by slightly time-shifting image signals to be outputted in parallel, as illustrated in FIG. 10.

Note that although each of the RGB image signals is composed of eight bits in the above-described example, the present example of modification is still applicable even when each of the RGB colors is represented by a 6-, 9-, 10-, 11- or 12-bit signal, or even when each of the RB colors is represented by a 5-bit signal and the G color by a 6-bit signal.

Furthermore, as the fourth example of modification, image signals may be grouped so that subgroups are formed within each of the RGB color signals, rather than grouping the image signals so as to be outputted serially as separate three RGB color signals but in parallel as grouped RGB color signals, as described earlier.

Figure 11:
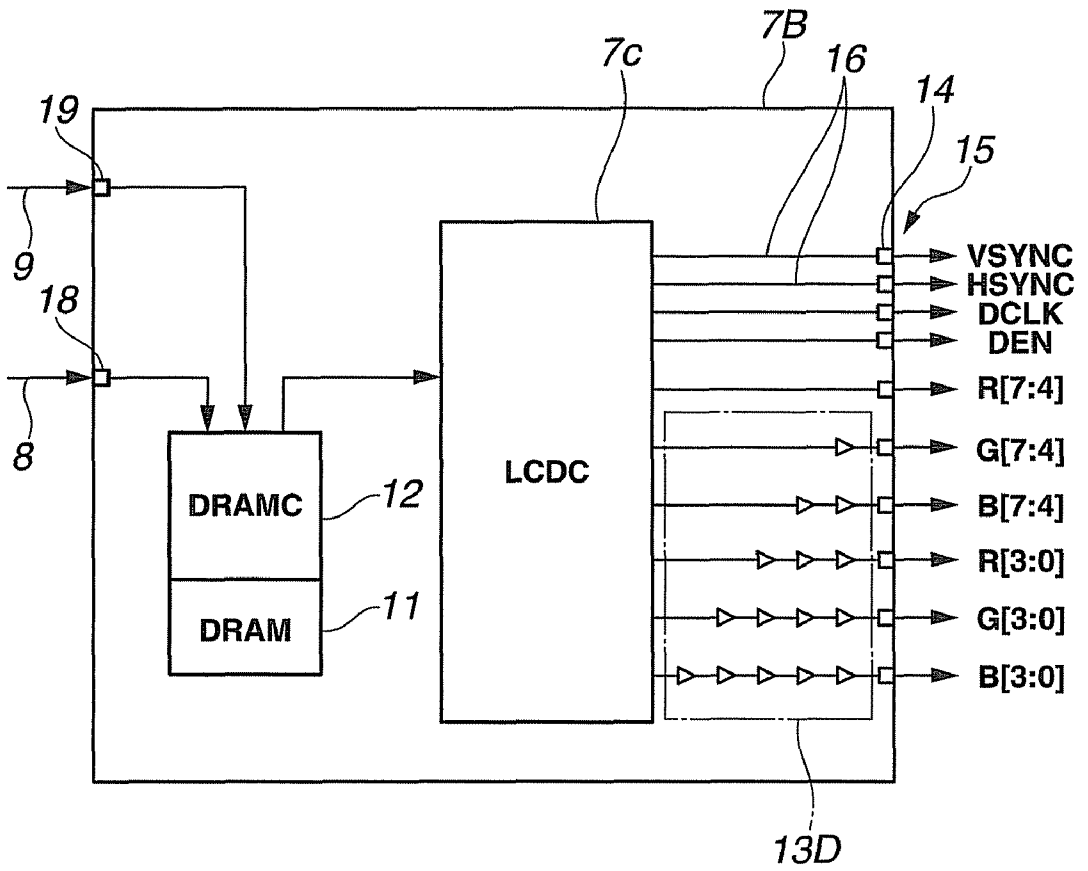
FIG. 11 is a block diagram illustrating an example of configuration of the LCDC in accordance with the fourth example of modification of the present invention.

FIG. 11 is a block diagram illustrating an example of configuration of an LCDC 7B in accordance with the fourth example of modification. In FIG. 11, an LCDC 7*c* serving as an image signal output circuit divides the RGB image signals into a plurality of groups greater than three groups and outputs the image signals serially within each group but in parallel among the groups. Each of the RGB image signals is divided into two groups and the LCDC 7*c* outputs each signal from each terminal portion 14 through six signal lines 16.

The LCDC 7B has a delay processing portion 13D and no delay circuits are provided in the signal line 16 corresponding to the higher-order 7th to 4th signals R[7:4], among the R image signals, belonging to a first group. One delay circuit 17 is provided in the signal line 16 corresponding to the higher-order 7th to 4th signals G[7:4], among the G image signals, belonging to a first group. Two delay circuits 17 are provided in the signal line 16 corresponding to the higher-order 7th to 4th signals B[7:4], among the B image signals, belonging to a first group. Three delay circuits 17 are provided in the signal line 16 corresponding to the higher-order 3rd to 0th signals R[3:0], among the R image signals, belonging to a second group. Four delay circuits 17 are provided in the signal line 16 corresponding to the higher-order 3rd to 0th signals G[3:0], among the G image signals, belonging to a second group. Five delay circuits 17 are provided in the signal line 16 corresponding to the higher-order 3rd to 0th signals B[3:0], among the B image signals, belonging to a second group. In the waveforms of output signals in this case, the total delay time TP of the six signal groups is 5×t1.

As described above, also in the case of FIG. 11 where not all image signals are outputted in parallel, a plurality of signal lines are grouped among image signals to be outputted in parallel, both sequentially from the one at the physical end position within a semiconductor device and by such a number of signal lines that the total sum of currents consumed during group-by-group image signal output does not exceed a predetermined current value.

In the fourth example of modification, like in the third example, a high driving capacity is also required for each circuit when some image signals are transferred serially. For this reason, such grouping as described above is performed to make it possible to suppress an instantaneous rise in power consumption by slightly time-shifting image signals to be outputted in parallel, whereas each image signal within a group is outputted serially.

Note that in this example of modification also, a plurality of signal lines need not be grouped sequentially from the one at the physical end position. For example, although the number of delay circuits increases in the order from G[7:4] to B[3:0] in the case of FIG. 11, the order may be changed. For example, the number of delay circuits may be made to increase in the order from B[3:0] to G[7:4], or increase not sequentially from the signal line at the end.

Also note that although each of the RGB color signals is divided into two groups each being composed of four bits in FIG. 11, each of the RGB color signals may be divided into three groups of bits, i.e., 3 bits, 3 bits and 2 bits, rather than grouping the RGB color signals so that each group is composed of the same number of bits. Specifically, if a single pixel is composed of, for example, 24 bits, the RGB color signals may be divided into nine groups, i.e., R[7:5], G[7:5], B[7:5], R[4:2], G[4:2], B[4:2], R[1:0], G[1:0] and B[1:0].

As heretofore described, in the third and fourth examples of modification, the LCDC 7*b* and LCDC 7*c* divide image signals, wherein each pixel of an image to be displayed is represented by a plurality of bits (for example, 24 bits), into a predetermined number of groups (for example, three R, G and B groups or six R, G and B groups) so that a plurality of image signals are outputted serially within a group of a plurality of bits thus divided but in parallel among the groups. In other words, the LCDC 7*b* and LCDC 7*c* serially output some of the image signals, wherein each pixel of an image to be displayed is represented by a plurality of bits, from the terminal group 15.

Figure 12:
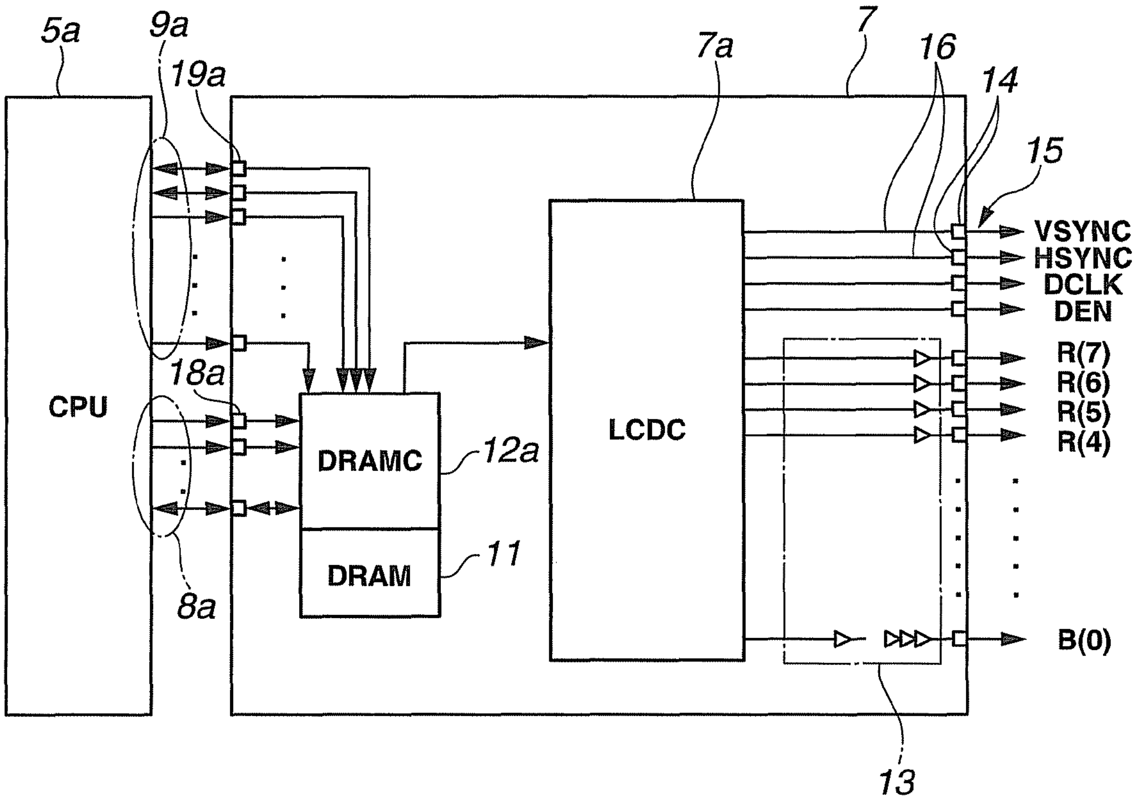
FIG. 12 is a block diagram intended to explain a case wherein the image signals and the like to be inputted to the LCDC 7 shown in FIG. 2 is inputted thereto in parallel.
Figure 13:
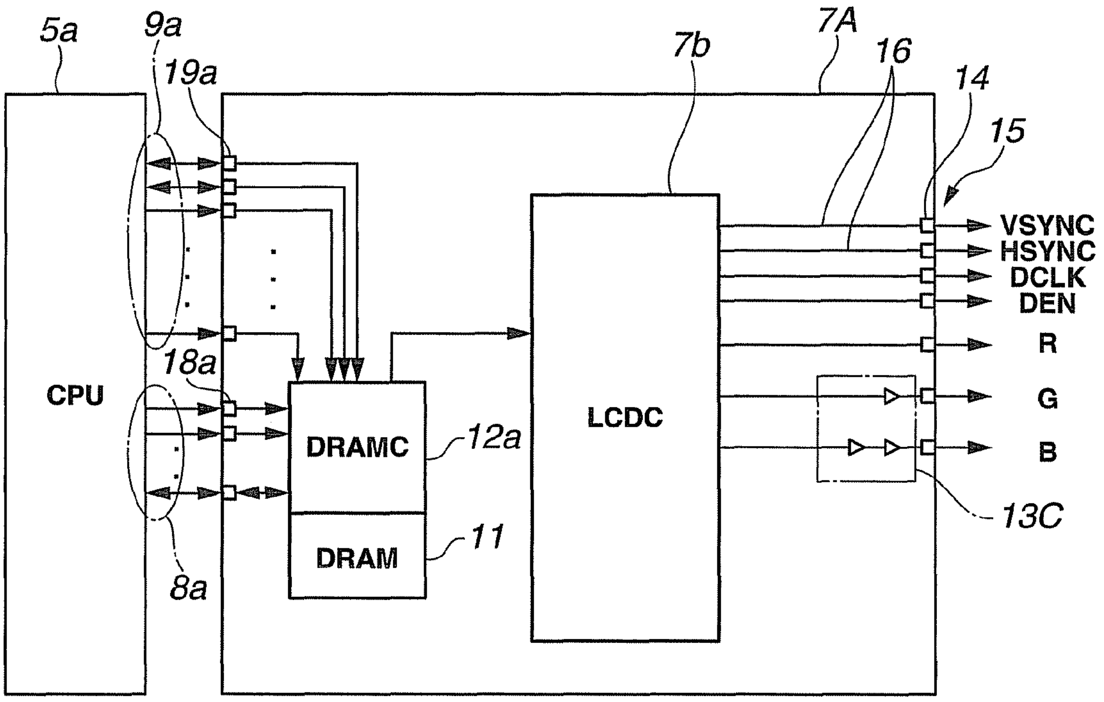
FIG. 13 is a block diagram intended to explain a case wherein the image signals and the like to be inputted to the LCDC 7A shown in FIG. 9 is inputted thereto in parallel.
Figure 14:
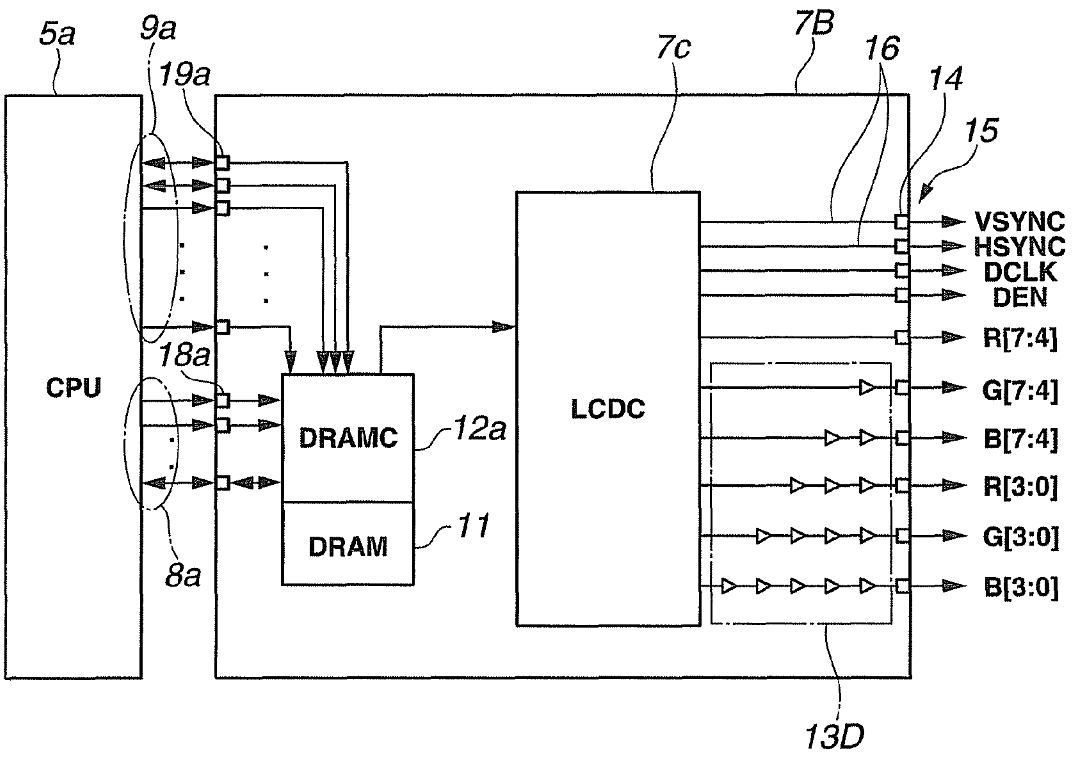
FIG. 14 is a block diagram intended to explain a case wherein the image signals and the like to be inputted to the LCDC 7B shown in FIG. 11 is inputted thereto in parallel.

Furthermore, in the above-described embodiments and examples of modification, image signals and the like are serially inputted to the LCDC 7, LCDC 7A, etc., from a CPU 5 which is a control portion. Alternatively, the image signals and the like inputted to the controller 7, controller 7A, etc. may be parallel signals. FIGS. 12 to 14 respectively illustrate examples of modification wherein such input of image signals and the like from the CPU to the LCDC is parallel input.

FIG. 12 is a block diagram intended to explain a case wherein the image signals and the like to be inputted to the LCDC 7 shown in FIG. 2 is inputted thereto in parallel. FIG. 13 is a block diagram intended to explain a case wherein the image signals to be inputted to the LCDC 7A shown in FIG. 9 is inputted thereto in parallel. FIG. 14 is a block diagram intended to explain a case wherein the image signals to be inputted to the LCDC 7B shown in FIG. 11 is inputted thereto in parallel.

As illustrated in FIG. 12, image signals from a CPU 5*a* are inputted to a DRAMC 12*a* of the LCDC 7 in parallel through a plurality of image signal lines 8*a* and a plurality of terminal portions 18*a*. Note that the DRAMC 12*a* includes a data control portion configured to arbitrate external and internal data. Likewise, various control signals from the CPU 5*a* are inputted to the DRAMC 12*a* in parallel through a plurality of control signal lines 9*a* and a plurality of terminal portions 19*a*. Likewise in FIGS. 13 and 14, image signals from a CPU 5*a* are inputted to the DRAMC 12*a*'s of the LCDC 7A and the LCDC 7B in parallel through a plurality of image signal lines 8*a* and a plurality of terminal portions 18*a*, and various control signals from the CPU 5*a* are inputted to the DRAMC 12*a*'s of the LCDC 7A and LCDC 7B through a plurality of control signal lines 9*a* and a plurality of terminal portions 19*a*.

Also in such configurations as illustrated in FIGS. 12 to 14, signal lines corresponding to a plurality of image signals outputted from a terminal group 15 are grouped so that the total sum of currents consumed during group-by-group image signal output does not exceed a predetermined current value. Consequently, there is no possibility of occurrence of a partial short supply of power due to a large amount of power being consumed partially and instantaneously within a semiconductor device.

As described above, according to the semiconductor device in accordance with the present embodiment and examples of modification, it is possible to prevent a short supply of power from occurring in other areas of circuitry due to a large amount of power being consumed partially and instantaneously within the semiconductor device. As a result, it is possible to prevent the circuitry within the semiconductor device from malfunctioning.

Note that in the embodiments and the examples of modification described heretofore, grouped image signals are outputted at an approximately equal time interval. More specifically, each group-to-group delay time shares the same length of time, i.e., t1. However, each group-to-group delay time may differ from each other. In other words, each group-to-group delay time may be t2, t3 or t4, different from t1, rather than being the same delay time t1.

Also note that although image signals are intended for display of images on an LCD, the display unit of a display device is not limited to an LCD. Alternatively, an organic EL display device, surface-conduction electron-emitter display (SED) device, or plasma display device may be used.

Furthermore, although a mobile phone is exemplified as the display device in the above-described embodiments and examples of modification, a personal digital assistant (PDA), digital camera, or television receiver may be used instead.

As heretofore described, according to the above-described embodiments and examples of modification, it is possible to realize a semiconductor device wherein instantaneous current consumption can be suppressed in outputting a plurality of image signals.

Furthermore, according to the present embodiments and examples of modification, it is possible to prevent a short supply of power from occurring in other areas of circuitry due to a large amount of power being consumed instantaneously, resulting in the advantageous effect of preventing the circuitry within the semiconductor device from malfunctioning. Another advantageous effect is that the power consumption of the display device as a whole is reduced. Accordingly, the present embodiments and the respective examples of modification are also effective for ordinary television receivers and other display devices configured to receive power from electric outlets. The reason for this is that the effect of reducing power consumption can be expected also in such television receivers and the like, considering the situation that the number of pixels has increased recently along with an increase in the resolution of a display device and, therefore, power is consumed instantaneously and simultaneously.

What is claimed is:

1. A semiconductor device comprising:

an image signal output circuit configured to output a plurality of image signals in parallel;

a plurality of signal lines respectively corresponding to said plurality of image signals to be outputted in parallel;

a plurality of first terminal portions respectively connected to said plurality of signal lines, and delay circuits configured to delay a plurality of image signals, which are divided into a plurality of groups to the extent that the sum of each value of a current flowing through each signal line does not exceed a predetermined current value based at least in part on a quantity N of image signals in each of the plurality of groups, where N is an integer greater than 1, and outputted from said plurality of first terminal portions, by a predetermined delay time from each other among said plurality of groups.

2. The semiconductor device according to claim 1, further including second terminal portions connected to said image signal output circuit so that a plurality of signals corresponding to said plurality of image signals are inputted to said second terminal portions and said plurality of signals are inputted to said image signal output circuit.

3. The semiconductor device according to claim 1, wherein said image signal output circuit outputs all of image signals, wherein each pixel of an image to be displayed is represented by a plurality of bits, in parallel from said plurality of first terminal portions.

4. The semiconductor device according to claim 3, wherein said division into a plurality of groups is performed so that the total sum of currents consumed during group-by-group output does not exceed a predetermined current value.

5. The semiconductor device according to claim 4, wherein said delay circuits are a plurality of buffer circuits provided in said plurality of signal lines between said image signal output circuit and said plurality of first terminal portions in order to delay said plurality of image signals by a predetermined delay time from each other.

6. The semiconductor device according to claim 5, wherein each of said plurality of buffer circuits includes two inverter circuits.

7. The semiconductor device according to claim 3, wherein said division into a plurality of groups is performed sequentially from an image signal at a physical end position within said semiconductor device.

8. The semiconductor device according to claim 7, wherein said division into a plurality of groups is performed so that the number of signal lines within each group is the same.

9. The semiconductor device according to claim 7, wherein said delay circuits are a plurality of buffer circuits provided in said plurality of signal lines between said image signal output circuit and said plurality of first terminal portions in order to delay said plurality of image signals by a predetermined delay time from each other.

10. The semiconductor device according to claim 9, wherein each of said plurality of buffer circuits includes two inverter circuits.

11. The semiconductor device according to claim 7, wherein said division into a plurality of groups is performed so that the total sum of currents consumed during group-by-group output does not exceed a predetermined current value.

12. The semiconductor device according to claim 1, wherein said image signal output circuit outputs image signals, wherein each pixel of an image to be displayed is represented by a plurality of bits, serially within each group but in parallel between groups.

13. The semiconductor device according to claim 12, wherein said division into a plurality of groups is performed sequentially from an image signal at a physical end position within said semiconductor device.

14. The semiconductor device according to claim 13, wherein said division into a plurality of groups is performed so that the number of signal lines within each group is the same.

15. The semiconductor device according to claim 13, wherein said delay circuits are a plurality of buffer circuits provided in said plurality of signal lines between said image signal output circuit and said plurality of first terminal portions in order to delay said plurality of image signals by a predetermined delay time from each other.

16. The semiconductor device according to claim 15, wherein each of said plurality of buffer circuits includes two inverter circuits.

17. The semiconductor device according to claim 12, wherein said division into a plurality of groups is performed so that the total sum of currents consumed during group-by-group output does not exceed a predetermined current value.

18. The semiconductor device according to claim 17, wherein said delay circuits are a plurality of buffer circuits provided in said plurality of signal lines between said image signal output circuit and said plurality of first terminal portions in order to delay said plurality of image signals by a predetermined delay time from each other.

19. The semiconductor device according to claim 18, wherein each of said plurality of buffer circuits includes two inverter circuits.

20. A display device equipped with a semiconductor device, comprising:

an image signal outputted circuit configured to output a plurality of image signals in parallel;

a plurality of signal lines respectively corresponding to said plurality of image signals to be outputted in parallel;

a plurality of first terminal portions respectively connected to said plurality of signal lines; and delay circuits configured to delay a plurality of image signals, which are divided into a plurality of groups to the extent that the sum of each value of a current flowing through each signal line does not exceed a predetermined current value based at least in part on a quantity N of image signals in each of the plurality of groups, where N is an integer greater than 1, and output from said plurality of first terminal portions, by a predetermined delay time from each other among said plurality of groups.

* * * * *